Figure 1:
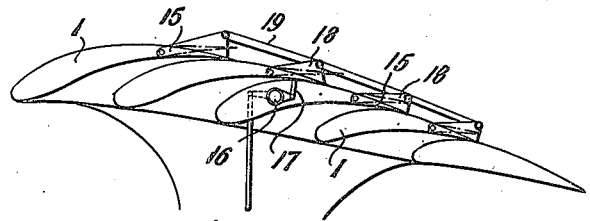

June 3, 1924.

F. H. PAGE

WING FOR AIRCRAFT

Original Filed May 14, 1921

1,496,731

Patented June 3, 1924.

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

WING FOR AIRCRAFT.

Original application filed May 14, 1921, Serial No. 469,402. Divided and this application filed August 14, 1922. Serial No. 581,822.

*To all whom it may concern:*

Be it known that I, FREDERICK HANDLEY PAGE, a subject of the King of Great Britain, residing at London, England, have invented certain new and useful Improvements in Wings for Aircraft, of which the following is a specification.

In the specification of United States Patent No. 1,353,666, dated 21st September 1920, an invention has been described in which a slot or slots is or are formed in the leading portion of a wing extending in a direction transverse to the direction of flight, in order to admit of the passage of air from the under side to the upper side, so as to prevent the burbling effect which takes place with wings when inclined to the air at a large angle of incidence, and by prevention of that burbling permitting the wings to be flown at still greater angles, and greatly improved lift coefficient being thereby obtained.

In a wing having slots of this kind, the wing has been considered as composed of a main wing and one or more auxiliary wings set in front of the leading edge thereof, and it has been stated in the specification that the auxiliary wings are set at a less angle of incidence than the main wings. Thus if there is a difference in angle of 30° between the chord of the main wing and the chord of the auxiliary wing, and the main wing happens to be at an angle of incidence of plus 10°, then the angle of incidence of the auxiliary wing would be minus 20°.

In the specification of my patent application Serial No. 469,402 filed May 14th 1921, of which this is a divisional application I have described a wing structure for aircraft, comprised by a plurality of wing sections each of wing form extending transversely to the longitudinal axis of the machine, one wing section being located rearward of the other from the leading edge to the trailing edge of said wing structure; a plurality of curved rails were provided extending transversely of such wing sections, and one of said wing sections was to be fixed to the rails, while the other wing sections were slidably connected to said curved rails, and means were provided for sliding said movable sections upon said curved rails relatively to said fixed wing section and to each other to cause said wing sections to be brought into contact with each other or to be separated from each other to form comparatively narrow through slots between said wing sections, and at the same time when said wing sections were so separated, to cause said wing structure to be of greater chord than when said wing sections were in contact with each other and said slots closed.

The present invention refers to a wing structure for aircraft comprised by a plurality of wing sections each of wing form, all extending transversely to the direction of flight, one wing section being located rearward of the other from the leading edge to the trailing edge of the wing structure, but according to the present invention the wing sections composing the wing structure are mounted and connected in fixed relation to each other and separated from each other to constitute comparatively narrow through slots extending in a direction transversely of the line of flight, the openings of said slots on the under side of said wing structure being located in advance of the openings of the said slots on the upper side of said wing structure. Each wing section comprises the main portion which is fixed relatively to the main portions of the other wing sections, and a separately constructed secondary portion, a pivot connecting each secondary portion to its main portion, and means are provided for simultaneously adjusting the secondary portions of the wing sections relatively to the main portions and to adjacent wing sections to open or close the openings of said slots on the upper side of the wing structure, all said wing sections being contained within a contour line of wing formation surrounding said wing structure, with which contour line portions of the surfaces of each wing section contact.

The invention will be described with reference to the accompanying drawings.

Fig. 1 is a diagram sectional side elevation of a wing structure, indicating also a portion of an interplane connection, in which wing structure the wing sections are in fixed relation to each other, while a secondary portion of each wing section is pivotally mounted to permit of the slots formed between the wing sections being opened or closed by adjustment of said secondary portions, the diagram illustrating in full lines the slots so closed, while the dotted lines indicate the slots opened.

Figure 2:
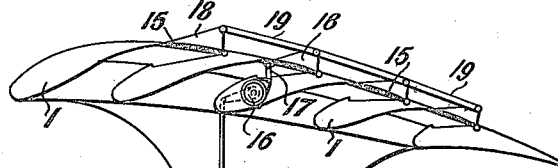
Figure 2:
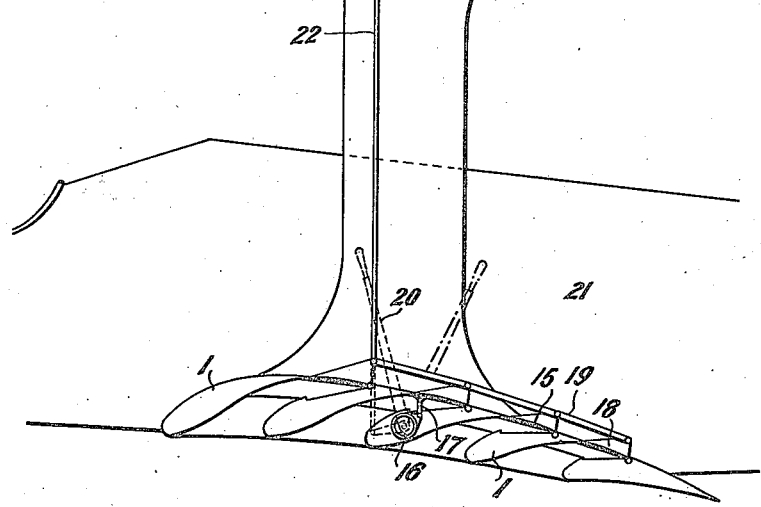
Figure 3:
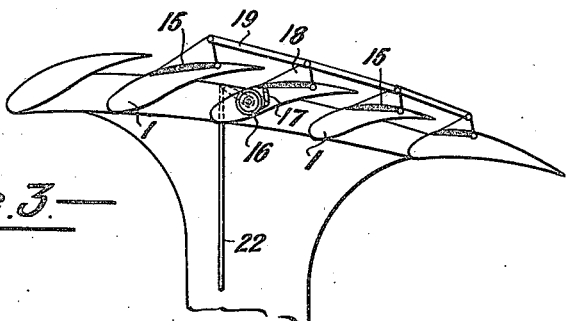

Fig. 2 is a diagram sectional side elevation of a portion of an aeroplane flying machine showing two wing structures according to this invention, a portion of an interplane connection, and a portion of a fuselage, Fig. 3 being a view of the upper wing structure of Fig. 2, the slots formed between the wing sections at Fig. 2 being closed and the same slots at Fig. 3 being shown opened.

Referring to Fig. 1 in which the wing sections 1 composing the wing structure are in fixed relation to each other, a rearward or trailing secondary portion 15 of each wing section 1, excepting the most rearwardly located wing section, is pivotally connected to the rearward part of the main wing section. With such a construction the pivoted secondary portion 15 of one wing section 1 can be adjusted so as to contact with the next rearward wing section to close the slot formed between two sections, or the pivoted secondary portion 15 can be adjusted to open the slots between the sections as indicated by the dotted lines at Fig. 1. The pivoted trailing portions 15 can be operated by any convenient means, and preferably by means that will operate all the trailing portions 15 simultaneously, and in the diagram construction shown, in order to effect this simultaneous adjustment, each pivoted secondary portion 15 has an upstanding bracket 18, the several brackets being pivotally connected by pivoted links 19.

A shaft 16, which passes through one of the wing sections, carries cranks which by connecting rods 17 are connected to one of the pivoted secondary portions 15, and means such as hereafter described with reference to Figs. 2 and 3 are provided for rocking the shaft 16, the effect of which will be to simultaneously adjust the pivoted trailing portions 15 into the desired positions to either open or close the slots formed between the wing sections.

Referring to Figs. 2 and 3 the wing sections 1 in this construction also are all in fixed relation to each other, but as will be observed at Fig. 3 a secondary portion of each wing section 1, rearward of the leading wing section, is pivotally mounted, that is each of these wing sections carries a pivoted secondary portion 15, which can be closed down into a suitable recess on the forward face of that particular wing section by which it is carried and on to which it is pivoted, and therefore such a portion 15 at that time constitutes a portion of the wing section.

Passing through one of the wing sections is a shaft 16, and cranks upon the shaft are connected by connecting rods 17 to one of the pivoted secondary portions 15. The pivoted secondary portions 15 carry upstanding brackets 18, the upstanding brackets of all the portions 15 being connected by pivoted links 19.

With such a mechanism it will be readily understood that upon the shaft 16 receiving angular adjustment all the portions 15 will be raised from the position shown at Fig. 3 to the position shown at Fig. 2 where the free end of each pivoted portion 15 will contact with the trailing edge of the next forward wing section, and thereby the slots formed between the wing sections will be closed. A reverse movement of the mechanism will naturally open the slots.

In this construction means are shown at Fig. 2 by which the slot-closing mechanism of both wing structures can be simultaneously operated; the mechanism shown by way of example, consists of a pivoted hand-lever 20 located in the fuselage 21, which hand-lever 20 is directly connected to the shaft 16 of the lower wing structure, and cranks on the shafts 16 of the upper and lower wing structures are connected by a connecting rod 22, so that upon the operation of the hand-lever 20 the movements of the shafts 16 and consequently of the pivoted secondary portions 15 of both wing structures will be synchronous.

What I claim as my invention and desire to secure by Letters Patent is:—

1. A wing structure for aircraft, comprised by a plurality of wing sections each of wing form all extending transversely to the direction of flight, one located rearward of the other from the leading edge to the trailing edge of said wing structure, and separated from each other to form comparatively narrow through slots each extending in a direction transversely of the line of flight, the openings of said slots on the under side of said wing structure being located in advance of the openings of said slots on the upper side of said wing structure, means for mounting and connecting said wing sections in fixed relation to each other to constitute said wing structure, each wing section having a secondary portion, a pivot connecting each secondary portion to its wing, and means for simultaneously adjusting the pivoted secondary portions of the wing sections relatively to the main portions and to adjacent wing sections to open or close the openings of said slots on the upper side of said wing structure, all said wing sections being contained within a contour line of wing formation surrounding said wing structure with which contour line portions of the surfaces of each wing section contact.

2. In a wing for aircraft constructed of a plurality of elements each of wing form and of varying sizes arranged in a fixed spaced relation to define the contour of the wing and to be separated by venturi form passages through the wing, closure members for said passages and control means for operating the closure members.

3. In a wing for aircraft constructed of a plurality of elements each of wing form and of varying sizes arranged in a fixed relation to define the contour of the wing and to constitute venturi form passages through the wing, closure members pivoted on said elements in such manner as when open they will constitute part of the surface of said elements and when closed will close said passages by contacting the next adjacent element, and means for rocking said closure elements on their pivots.

In witness whereof I have hereunto set my hand in the presence of two witnesses.

FREDERICK HANDLEY PAGE.

Witnesses:
 THOMAS WILLIAM ROGERS,
 LESLIE FRANK ROGERS.